(12) United States Patent
Hovgaard et al.

(10) Patent No.: US 12,012,936 B2
(45) Date of Patent: Jun. 18, 2024

(54) WIND TURBINE CONTROL USING PREDICTED STEADY- STATE DEFLECTION

(71) Applicant: VESTAS WIND SYSTEMS A/S, Aarhus N (DK)

(72) Inventors: Tobias Gybel Hovgaard, Ry (DK); Jacob Deleuran Grunnet, Tranbjerg J (DK)

(73) Assignee: VESTAS WIND SYSTEMS A/S, Aarhus N (DK)

(*) Notice: Subject to any disclaimer, the term of this patent is extended or adjusted under 35 U.S.C. 154(b) by 189 days.

(21) Appl. No.: 17/609,677

(22) PCT Filed: May 5, 2020

(86) PCT No.: PCT/DK2020/050132
§ 371 (c)(1),
(2) Date: Nov. 8, 2021

(87) PCT Pub. No.: WO2020/224738
PCT Pub. Date: Nov. 12, 2020

(65) Prior Publication Data
US 2022/0307472 A1    Sep. 29, 2022

(30) Foreign Application Priority Data

May 9, 2019    (DK) .............. PA 2019 70299

(51) Int. Cl.
*F03D 7/02*        (2006.01)
*F03D 7/04*        (2006.01)
(52) U.S. Cl.
CPC .......... *F03D 7/0302* (2023.08); *F03D 7/0224* (2013.01); *F03D 7/0296* (2013.01);
(Continued)
(58) Field of Classification Search
None
See application file for complete search history.

(56) References Cited

U.S. PATENT DOCUMENTS

| | | | |
|---|---|---|---|
| 8,866,322 B2 * | 10/2014 | Tchoryk, Jr. ............ | G01S 17/87 290/55 |
| 2007/0212209 A1 * | 9/2007 | Borgen ................... | F03D 7/042 415/1 |

(Continued)

FOREIGN PATENT DOCUMENTS

| | | |
|---|---|---|
| EP | 1770278 A2 | 4/2007 |
| EP | 2025929 A2 | 2/2009 |

(Continued)

OTHER PUBLICATIONS

Wael et al (A LiDAR-based pitch control strategy for ultra large wind turbines—Published Dec. 2017) (Year: 2017).*

(Continued)

*Primary Examiner* — Juan G Flores
(74) *Attorney, Agent, or Firm* — Patterson + Sheridan, LLP

(57) ABSTRACT

Controlling a wind turbine including measuring a wind speed for a location upwind of a wind turbine. Using the measured wind speed, a changed steady-state deflection of a structure of the wind turbine is predicted. The predicted changed steady-state deflection corresponds to a time when wind from the location is incident on the wind turbine. Oscillations of the structure are damped relative to the changed steady-state deflection. By damping the oscillations relative to the changed steady-state deflection, movements of the structure may be minimized when there is no predicted change in steady-state deflection, while permitting more rapid movements during transitions from one steady-state deflection to the predicted steady-state deflection, allowing more of the available power to be captured by the wind turbine.

17 Claims, 7 Drawing Sheets

(52) U.S. Cl.
CPC ........ *F03D 7/045* (2013.01); *F05B 2260/821* (2013.01); *F05B 2270/32* (2013.01); *F05B 2270/404* (2013.01); *F05B 2270/8042* (2013.01)

(56) References Cited

U.S. PATENT DOCUMENTS

| | | |
|---|---|---|
| 2015/0152847 A1 | 6/2015 | Guadayol Roig |
| 2017/0306926 A1 | 10/2017 | Deshpande et al. |
| 2018/0017042 A1* | 1/2018 | Baun .................. H02K 7/1838 |

FOREIGN PATENT DOCUMENTS

| | | |
|---|---|---|
| WO | 2011022024 A1 | 2/2011 |
| WO | 2020224738 A1 | 11/2020 |

OTHER PUBLICATIONS

Danish Patent and Trademark Office, 1st Technical Examination of Patent Application including the Search Report and Search Opinion for Application PA 2019 70299 dated Nov. 14, 2019.

Farag Wael et al: A LiDAR-based pitch control strategy for ultra large wind turbines, 2017 Nineteenth International Middle East Power Systems Conference (MEPCON), IEEE, Dec. 19, 2017 (Dec. 19, 2017), pp. 451-458, XP033325956, DOI: 10.1109/MEPCON.20107.8301219.

PCT, International Search Report and Written Opinion of the International Searching Authority for Application PCT/DK2020/050132 dated Jul. 27, 2020.

* cited by examiner

WIND TURBINE CONTROL USING PREDICTED STEADY- STATE DEFLECTION

BACKGROUND

Field of the Invention

Embodiments presented in this disclosure generally relate to techniques for wind turbine control using predicted steady-state deflection.

Description of the Related Art

A typical horizontal-axis wind turbine includes a rotor arranged at the top of a tower. Structures of the wind turbine, such as the top of the tower, are deflected during operation of the wind turbine, and the deflection can vary for different wind speeds. The deflections can, in turn, affect the operation of the wind turbine, such as increased fatigue loading on the structures, changed aerodynamic properties of the wind turbine, and so forth.

SUMMARY

One embodiment of the present disclosure is a method comprising measuring a wind speed for a location upwind of a wind turbine, and predicting, using the measured wind speed, a changed steady-state deflection of a structure of the wind turbine once wind from the location is incident on the wind turbine. The method further comprises damping oscillations of the structure relative to the changed steady-state deflection.

Beneficially, damping the oscillations of the structure relative to the changed steady-state deflection, the movement of the structure may be minimized when there is no predicted change in steady-state deflection, while permitting more rapid movement of the structure during transition periods from one steady-state deflection to the predicted steady-state deflection, which permits more of the available power in the wind to be captured by the wind turbine.

Another embodiment of the present disclosure is a control system for a wind turbine, the control system comprising one or more computer processors configured to receive a measurement of a wind speed for a location upwind of the wind turbine. The one or more computer processors are further configured to predict, using the measured wind speed, a changed steady-state deflection of a structure of the wind turbine once wind from the location is incident on the wind turbine. The one or more computer processors are further configured to generate one or more control signals to damp oscillations of the structure relative to the changed steady-state deflection.

Beneficially, damping the oscillations of the structure relative to the changed steady-state deflection, the movement of the structure may be minimized when there is no predicted change in steady-state deflection, while permitting more rapid movement of the structure during transition periods from one steady-state deflection to the predicted steady-state deflection, which permits more of the available power in the wind to be captured by the wind turbine.

Another embodiment of the present disclosure is a wind turbine comprising a structure and a controller configured to receive a measurement of a wind speed for a location upwind of the wind turbine. The controller is further configured to predict, using the measured wind speed, a changed steady-state deflection of the structure once wind from the location is incident on the wind turbine. The controller is further configured to generate one or more control signals to damp oscillations of the structure relative to the changed steady-state deflection.

Beneficially, damping the oscillations of the structure relative to the changed steady-state deflection, the movement of the structure may be minimized when there is no predicted change in steady-state deflection, while permitting more rapid movement of the structure during transition periods from one steady-state deflection to the predicted steady-state deflection, which permits more of the available power in the wind to be captured by the wind turbine.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DESCRIPTION OF EXAMPLE EMBODIMENTS

Example Embodiments

Structures of a wind turbine can be deflected during operation of the wind turbine, and the deflection can vary for different wind speeds. Using the top of the tower as an example structure, the deflection of the top of the tower affects the amount of power from the wind that can be extracted by the rotor. For example, when the average (mean) wind speed is unchanged, the deflection of the top of the tower changes according to transient changes in the wind speed (e.g., turbulence). When the control of the wind turbine prioritizes minimizing changes in the deflection, the controller can strongly penalize any tower top velocity (e.g., using a cost function), so that the controller acts to minimize any tower top velocity.

However, when the average wind speed changes, the change in deflection that is observed by the controller initially appears indistinct from turbulence-driven deflection. Although it is desirable to minimize changes in the deflection to reduce fatigue loads, controlling the wind turbine aggressively to minimize changes in the deflection corresponds to less-responsive changes to power production for changes in average wind speed. When the control prioritizes minimizing changes in the deflection, some of the available power in the wind may remain uncaptured by the wind turbine during changes in average wind speed, as the power production is adapted more slowly to the new average wind speed (e.g., to prioritize protecting the tower). However, when the tower top velocity is not so strongly minimized, thus permitting the power production to track more responsively changes in average wind speed, the tower damping tends to be less efficient in cases where the average wind speed is not changing. Thus, a tension exists between optimized power production of the wind turbine and penalizing the tower top velocity.

According to embodiments described herein, a method of controlling a wind turbine comprises measuring a wind speed for a location upwind of a wind turbine. Using the measured wind speed, a changed steady-state deflection of the structure is predicted. The predicted changed steady-state deflection corresponds to a time when wind from the location is incident on the wind turbine. Oscillations of the structure are damped relative to the changed steady-state deflection. By damping the oscillations relative to the changed steady-state deflection, movements of the structure may be minimized when there is no predicted change in steady-state deflection, while permitting more rapid movements during transitions from one steady-state deflection to the predicted steady-state deflection, allowing more of the available power to be captured by the wind turbine.

Figure 1:
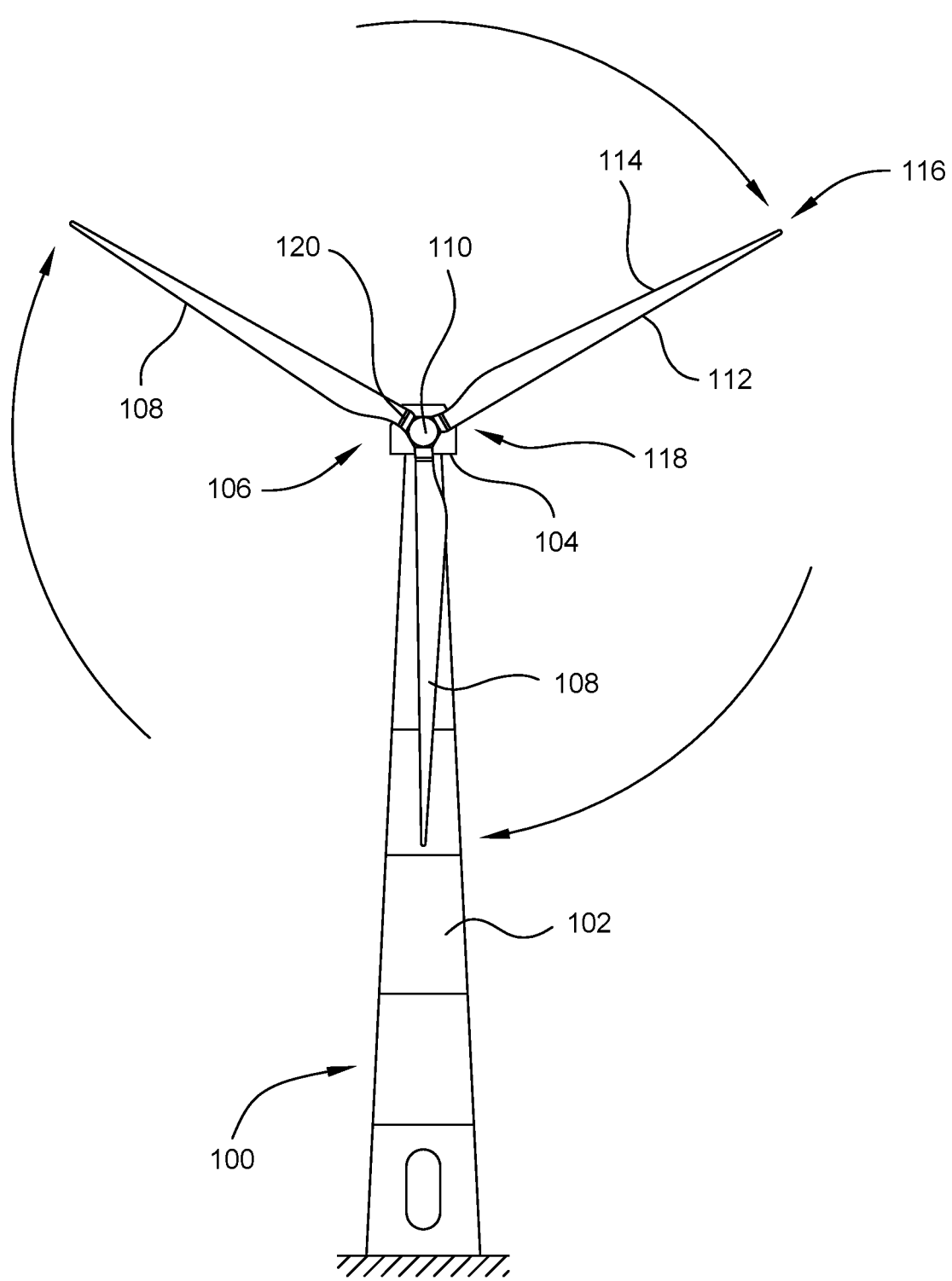
FIG. 1 illustrates a diagrammatic view of an exemplary wind turbine, according to one or more embodiments.

FIG. 1 illustrates a diagrammatic view of an exemplary wind turbine 100. Although the wind turbine 100 is illustrated as a horizontal-axis wind turbine, the principles and techniques described herein may be applied to other wind turbine implementations, such as vertical-axis wind turbines. The wind turbine 100 typically comprises a tower 102 and a nacelle 104 located at the top of the tower 102. A rotor 106 may be connected with the nacelle 104 through a low-speed shaft extending out of the nacelle 104. As shown, the rotor 106 comprises three rotor blades 108 mounted on a common hub 110 which rotate in a rotor plane, but the rotor 106 may comprise any suitable number of rotor blades 108, such as one, two, four, five, or more rotor blades 108. The rotor blades 108 (or airfoils) typically each have an aerodynamic shape with a leading edge 112 for facing into the wind, a trailing edge 114 at the opposite end of a chord for the rotor blades 108, a tip 116, and a root 118 for attaching to the hub 110 in any suitable manner.

For some embodiments, the rotor blades 108 may be connected to the hub 110 using pitch bearings 120, such that each rotor blade 108 may be rotated around its longitudinal axis to adjust the pitch of the rotor blade 108. The pitch angle of a rotor blade 108 relative to the rotor plane may be controlled by a pitch actuation system comprising, e.g., linear actuators, hydraulic actuators, or stepper motors connected between the hub 110 and the rotor blades 108.

Figure 2:
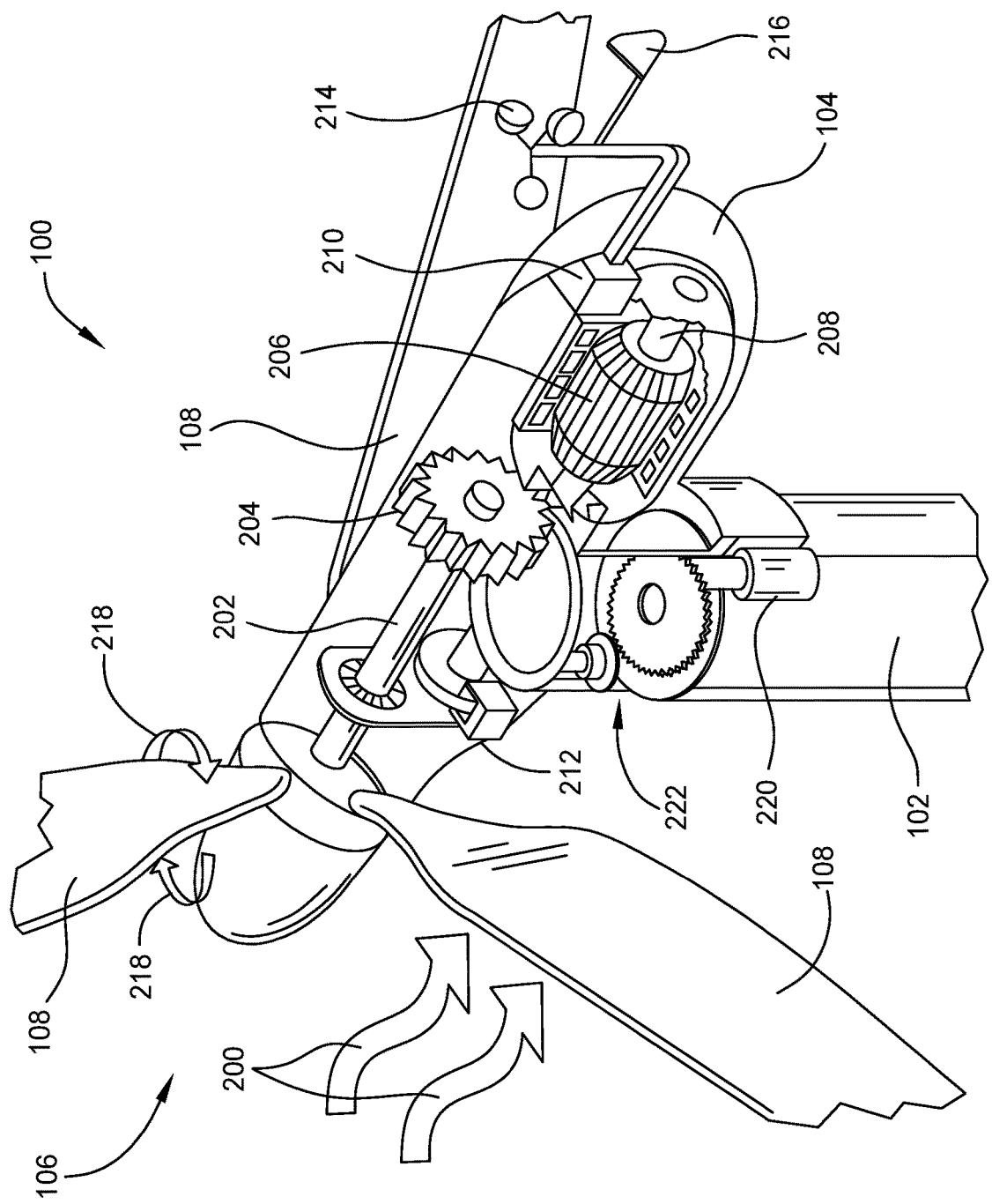
FIG. 2 illustrates a diagrammatic view of internal components of an exemplary nacelle and tower of a wind turbine, according to one or more embodiments.

FIG. 2 illustrates a diagrammatic view of typical components internal to the nacelle 104 and tower 102 of the wind turbine 100. When the wind 200 is incident on the rotor blades 108, the rotor 106 rotates and rotates a low-speed shaft 202. Gears in a gearbox 204 mechanically convert the low rotational speed of the low-speed shaft 202 into a relatively high rotational speed of a high-speed shaft 208 suitable for generating electricity using a generator 206.

A controller 210 may sense the rotational speed of one or both of the low-speed shaft 202 and the high-speed shaft 208. If the controller 210 determines that the low-speed shaft 202 and/or the high-speed shaft 208 are rotating too fast, the controller 210 may pitch the rotor blades 108 out of the wind and/or may increase the torque from the generator 206, which slows the rotation (i.e., reduces a revolutions per minute (RPM)) of the rotor 106. A braking system 212 may prevent damage to the components of the wind turbine 100 by preventing the rotor 106 from rotating when the rotor 106 is already at, or very close, to standstill. The controller 210 may also receive inputs from wind sensors, such as an anemometer 214 (providing wind speed) and/or a wind vane 216 (providing wind direction). Based on information received, the controller 210 may send a control signal to adjust a pitch 218 of one or more of the rotor blades 108. By adjusting the pitch 218 of the rotor blades 108, the rotational speed of the rotor 106 (and therefore, the rotational speed of the low-speed shaft 202 and the high-speed shaft 208) may be increased or decreased. Based on the wind direction, for example, the controller 210 may send a control signal to an assembly comprising a yaw motor 220 and a yaw drive 222 to rotate the nacelle 104 with respect to the tower 102, such that the rotor 106 may be positioned to face more (or, in certain circumstances, less) upwind.

Figure 3:
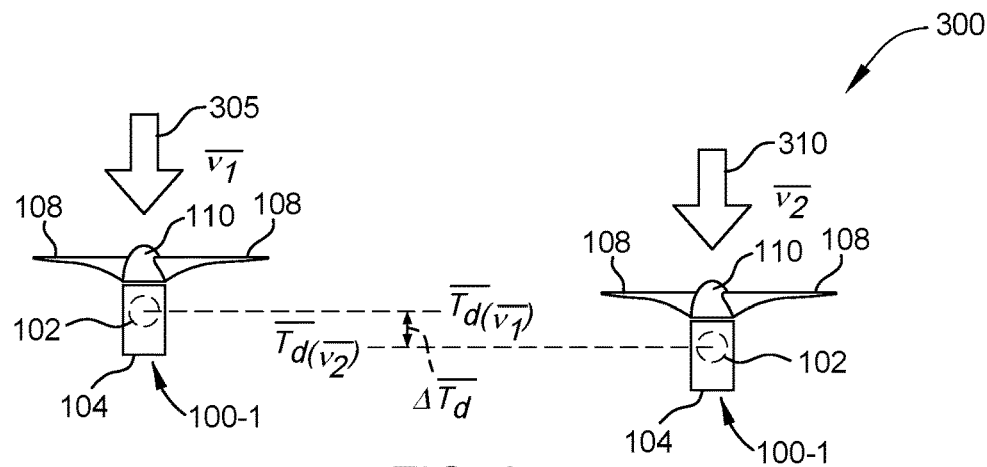
FIG. 3 illustrates steady-state deflection of a tower for different average wind speeds, according to one or more embodiments.

FIG. 3 illustrates steady-state deflection of a tower for different average wind speeds, according to one or more embodiments. The features depicted in diagram 300 may be used in conjunction with other embodiments.

Diagram 300 illustrates a top view of a wind turbine 100-1 (representing one example of the wind turbine 100 depicted in FIGS. 1 and 2). The top of the tower 102 of the wind turbine 100-1 is illustrated in outline. When a wind 305 having a first average wind speed $\overline{v}_1$ is incident on the wind turbine 100-1, the top of the tower 102 has a first steady-state deflection $\underline{T}_d(\underline{v}_1)$ when the wind turbine 100-1 has an optimal power capture for the first average wind speed $\underline{v}_1$. When a wind 310 having a second average wind speed $\overline{v}_2$ that is greater than $\underline{v}_1$ is incident on the wind turbine 100-1, the top of the tower 102 has a second steady-state deflection $\underline{T}_d(\underline{v}_2)$ when the wind turbine 100-1 has for optimal power capture at the second average wind speed $\underline{v}_2$. A difference between the first steady-state deflection $\overline{T}_d(\underline{v}_1)$ and the second steady-state deflection $\underline{T}_d(\underline{v}_2)$ is represented as $\Delta \underline{T}_d$. Each of the first steady-state deflection $\underline{T}_d(\underline{v}_1)$ and the second steady-state deflection $\underline{T}_d(\underline{v}_2)$ results from forces applied by the respective wind 305, 310, as well as the thrust force that is generated by the wind turbine 100-1 at the respective average wind speeds $\underline{v}_1$, $\underline{v}_2$. In some embodiments, the optimal power capture for the first average wind speed $\underline{v}_1$ and for the second average wind speed $\underline{v}_2$ corresponds to partial load power production (i.e., less than a rated, "full load" power production) by the wind turbine 100-1. In other embodiments, the optimal power capture for the first average wind speed $\underline{v}_1$ and for the second average wind speed $\underline{v}_2$ corresponds to overrated power production (i.e., greater than the rated power production of the wind turbine 100-1).

As shown, the first steady-state deflection $\underline{T}_d(\underline{v}_1)$ and the second steady-state deflection $\underline{T}_d(\underline{v}_2)$ each represent a fore-aft deflection mode (or bending mode) of the tower 102 of the wind turbine 100-1. However, the control techniques described herein may be beneficially applied to other deflection modes of the tower 102 (e.g., a side-side deflection mode), as well as to deflection modes of other components of the wind turbine 100-1 (e.g., in-plane and flapwise deflection modes of a rotor blade). Further, the techniques are not limited to implementations of the wind turbine 100-1 having a single rotor, but may be also be beneficially applied to implementations of wind turbines having multiple rotors.

Figure 4A:
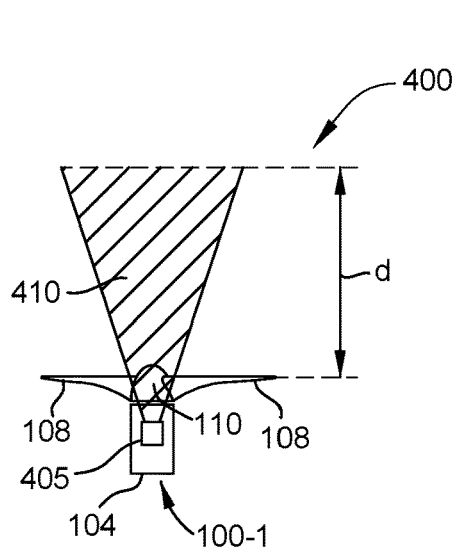
FIGS. 4A-4C illustrate several exemplary arrangements for measuring wind speed upwind of a wind turbine, according to one or more embodiments.
Figure 4B:
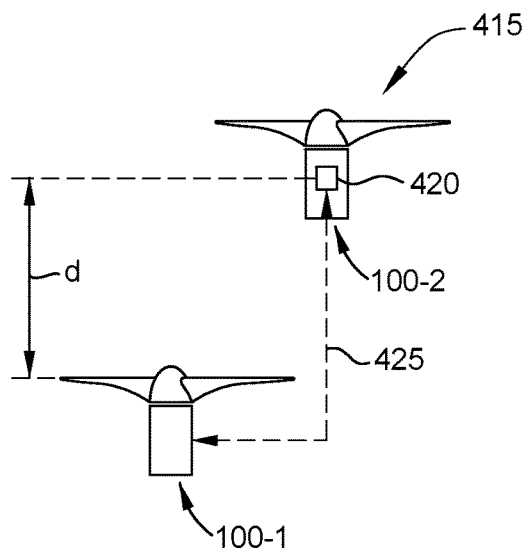
Figure 4C:
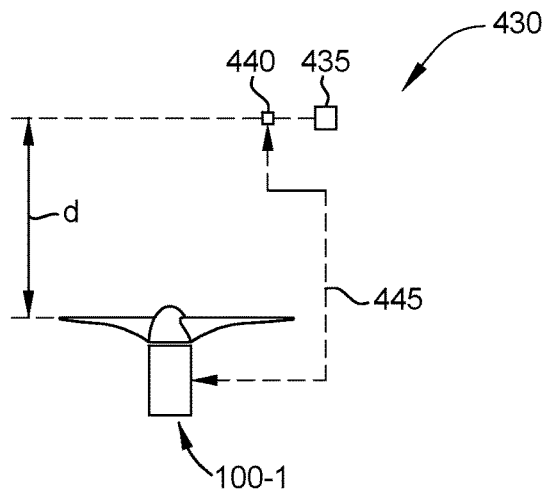

FIGS. 4A-4C illustrate several exemplary arrangements for measuring wind speed upwind of a wind turbine, according to one or more embodiments. The features depicted in diagrams 400, 415, and 430 may be used in conjunction with other embodiments.

Diagram 400 illustrates a Light Detection and Ranging (LIDAR) system 405 disposed on the wind turbine 100-1. The LIDAR system 405 is illustrated as being disposed on the top of the nacelle 104; however, alternate implementations of the wind turbine 100-1 may have the LIDAR system 405 in a suitable alternate location (e.g., disposed on the hub 110 or on the tower 102). Further, in some alternate embodiments, the LIDAR system 405 may be remote from the wind turbine 100-1 (e.g., mounted at ground level, disposed on a met mast, or disposed on another wind turbine). The LIDAR system 405 uses pulsed laser light within a scan pattern 410 to measure atmospheric characteristics, such as wind speed and wind direction, at a particular measurement distance d from the rotor plane of the wind turbine 100-1.

In some embodiments, the LIDAR system 405 acquires measurements of a wind speed for a location upwind of the wind turbine 100-1 (as shown, at the measurement distance d). Using the measured wind speed, a control system of the wind turbine 100-1 predicts a changed steady-state deflection of a bending mode of the wind turbine 100-1. The predicted changed steady-state deflection corresponds to a time when wind from the location is incident on the wind turbine 100-1. In some embodiments, the time when wind is incident on the wind turbine 100-1 can be calculated as a quotient of the measurement distance d (dividend) and the wind speed reflected in the measurements (divisor). Oscillations of the wind turbine 100-1 are damped relative to the changed steady-state deflection. By damping the oscillations relative to the changed steady-state deflection, the tower movement may be minimized when there is no predicted change in steady-state deflection, while permitting rapid tower movement during transitions from one steady-state deflection to another steady-state deflection.

Diagram 415 illustrates a sensor 420 disposed on another wind turbine 100-2 that is disposed upwind of the wind turbine 100-1. Although illustrated as being disposed on the nacelle of the wind turbine 100-2, the sensor 420 may be in any suitable alternate location (e.g., disposed on the hub or on the tower of the wind turbine 100-2). The sensor 420 may have any implementation suitable for measuring wind speed, such as a mechanical anemometer (e.g., a cup or vane anemometer), an ultrasonic anemometer, a LIDAR system, and so forth. A sensor signal reflecting the measurements of the wind speed by the sensor 420 is communicated to a control system of the wind turbine 100-1 via a communication link 425, which includes any suitable means for communicating between the wind turbines 100-1, 100-2 (e.g., wireline, wireless, optical, etc.).

Diagram 430 illustrates a sensor 440 disposed on a met mast 435 (or measurement tower). The sensor 440 is disposed upwind of the wind turbine 100-1. The sensor 440 may have any implementation suitable for measuring wind speed, such as a mechanical anemometer (e.g., a cup or vane anemometer), an ultrasonic anemometer, a LIDAR system, and so forth. A sensor signal reflecting the measurements of the wind speed by the sensor 440 is communicated to a control system of the wind turbine 100-1 via a communication link 445, which includes any suitable means for communicating between the sensor 440 and the wind turbine 100-1 (e.g., wireline, wireless, optical, etc.).

Figure 5:
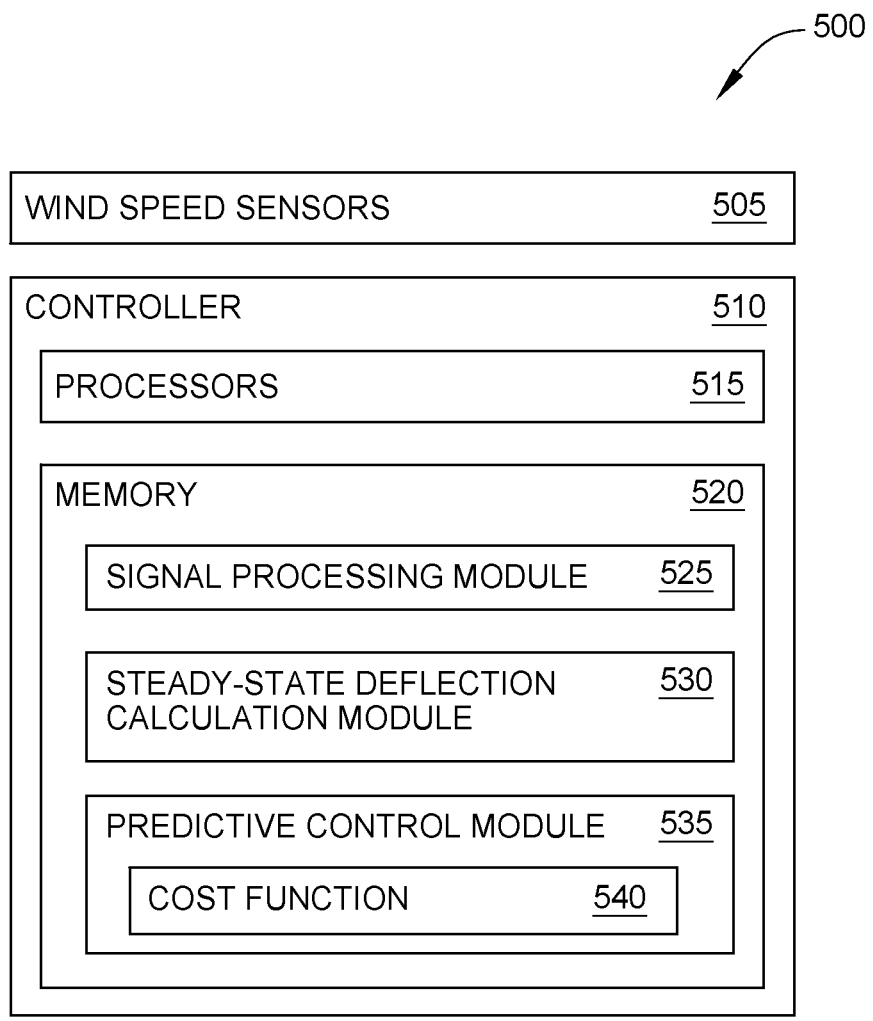
FIG. 5 is a block diagram of an exemplary control system for a wind turbine, according to one or more embodiments.

FIG. 5 is a block diagram of an exemplary control system 500 for a wind turbine, according to one or more embodiments. The features of the control system 500 may be used in conjunction with other embodiments. For example, the control system 500 may control the operation of the wind turbine 100-1 of FIGS. 4A-4C.

The control system 500 comprises one or more wind speed sensors 505 and a controller 510. The one or more wind speed sensors 505 acquire measurements of a wind speed for a location upwind of the wind turbine to be controlled. The one or more wind speed sensors 505 may have any suitable implementation, e.g., the LIDAR system 405 or the sensors 420, 440 illustrated in FIGS. 4A-4C.

The controller 510 comprises one or more computer processors 515 (or "processors") and a memory 520. The controller 510 may have any suitable implementation, such as a wind turbine controller specific to the controlled wind turbine, a power plant controller that controls multiple wind turbines, and so forth. The one or more processors 515 represent any number of processing elements that each can include any number of processing cores. The memory 520 can include volatile memory elements (such as random access memory), non-volatile memory elements (such as solid-state, magnetic, optical, or Flash-based storage), and combinations thereof. Moreover, the memory 520 can be distributed across different mediums (e.g., network storage or external hard drives).

The one or more processors 515 are communicatively coupled with the one or more wind speed sensors 505. Although not shown, the one or more processors 515 may be further coupled with one or more wind turbine systems, such as a generator, a converter, a pitch actuation system, auxiliary systems and so forth.

The memory 520 may include a plurality of "modules" for performing various functions described herein. In one embodiment, each module includes program code that is executable by one or more of the processors 515. However, other embodiments may include modules that are partially or fully implemented in hardware (i.e., circuitry) or firmware of the controller 510. As shown, the memory 520 comprises a signal processing module 525 that performs processing on sensor signals received from the one or more wind speed sensors 505. The memory 520 further comprises a steady-state deflection calculation module 530 that predicts a steady-state deflection of the wind turbine using the measured wind speed. The memory 520 further comprises a predictive control module 535 that estimates a time series of values for a control signal of the wind turbine, and optimizes the time series of values according to a cost function 540. The cost function 540 penalizes deflections of the wind turbine relative to the steady-state deflection predicted by the steady-state deflection calculation module 530. In some embodiments, the predictive control module 535 receives a time sequence of average wind speeds from the signal processing module 525, and calculates an optimized trajectory (or time sequence) for transitioning the deflection from an initial steady-state deflection to the predicted steady-state deflection. The predictive control module 535 generates the time series of values for the control signal based on the optimized trajectory.

Figure 6:
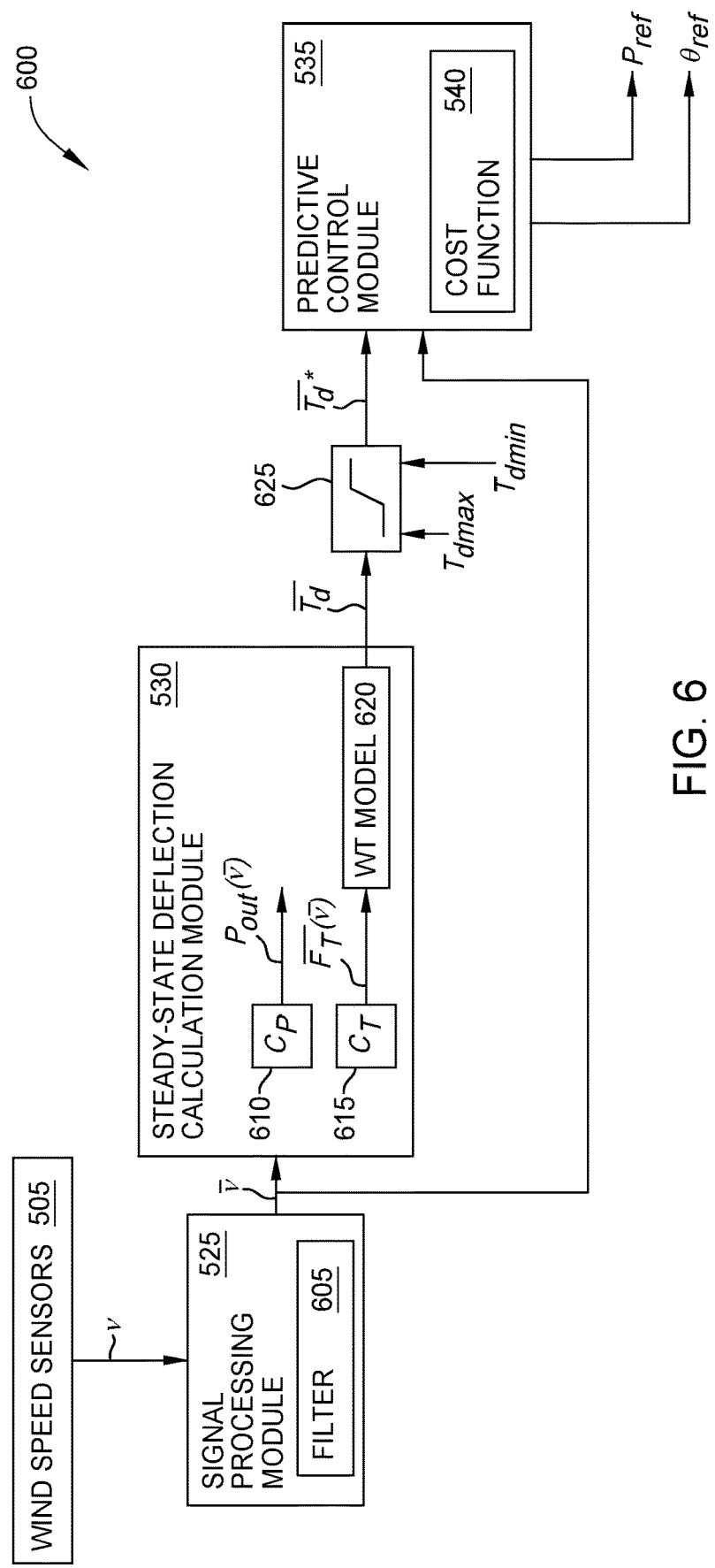
FIG. 6 is a block diagram illustrating exemplary operation of the control system of FIG. 5, according to one or more embodiments.

FIG. 6 is a block diagram 600 illustrating exemplary operation of the control system 500 of FIG. 5, according to one or more embodiments. The features depicted in the block diagram 600 may be used in conjunction with other embodiments.

In the block diagram 600, a time sequence of wind speed measurements (v) for a location upwind of the wind turbine are acquired by the one or more wind speed sensors 505. The signal processing module 525 receives the wind speed measurements (v), and generates a time sequence of average wind speed values ($\bar{v}$). In some embodiments, the signal processing module 525 comprises a filter 605, such as a low-pass filter (LPF). Applying the filter 605 to the wind speed measurements (v) operates to remove transient components (i.e., turbulence). The signal processing module 525 may perform additional processing of the wind speed measurements (v).

The steady-state deflection calculation module 530 receives the average wind speed values ($\bar{v}$), and using a coefficient of power ($C_P$) table 610 determines optimized power production levels $P_{out}(v)$ that are scheduled for the average wind speed values ($\bar{v}$). In some embodiments, the optimized power production levels $P_{out}(\bar{v})$ correspond to partial load power production of the wind turbine. In other embodiments, the optimized power production levels $P_{out}(\bar{v})$ correspond to overrated power production of the wind turbine. Using a thrust coefficient ($C_T$) table 615, the steady-state deflection calculation module 530 determines thrust force values $\overline{F_T(v)}$ for the average wind speed values ($\bar{v}$) and the power production levels $P_{out}(\bar{v})$. The thrust force values $\overline{F_T(v)}$ are applied to a wind turbine model 620 describing structural characteristics of the wind turbine, and steady-state deflection values $\overline{T_d}$ are predicted for the average wind speed values ($\bar{v}$).

In some embodiments, prior to damping the oscillations, the control system determines whether the predicted steady-state deflection values $\overline{T_d}$ do not exceed a threshold deflection. In some embodiments, the threshold deflection represents an extreme loading constraint specified for the particular structure of the wind turbine. As shown, a saturation block 625 limits the predicted steady-state deflection values $\overline{T_d}$ to a range defined between a minimum deflection $T_{dmin}$ (a lower threshold deflection) and a maximum deflection $T_{dmax}$ (an upper threshold deflection). The saturation block 625 outputs predicted steady-state deflection values $\overline{T_d}^*$ to the predictive control module 535. In alternate embodiments, the predicted steady-state deflection values $\overline{T_d}$ are provided to the predictive control module 535 without being processed through the saturation block 625.

The predictive control module 535 receives the predicted steady-state deflection values $\overline{T_d}^*$ and the average wind speed values ($\bar{v}$), and applies a cost function 540 that penalizes deflections of the structure relative to the predicted steady-state deflection values $\overline{T_d}^*$. In some embodiments, the predictive control module 535 performs predictive control according to techniques described in U.S. Pat. No. 9,217,416, which is herein incorporated by reference in its entirety. In some embodiments, the predictive control module 535 uses model-based predictive control, in which the model receives as inputs measured parameters related to operation of the wind turbine (e.g., sensor measurements), wind turbine inputs (e.g., control signals), and/or wind turbine outputs (e.g., power production).

The model includes an envelope that defines acceptable outer limits of operation of the wind turbine (e.g., operating outside the bounding box would cause an unacceptable fatigue loading of wind turbine components, unacceptable risk of a component failure, etc.). For operation within the envelope, the model applies an objective function for the received measured parameters, wind turbine inputs, and/or wind turbine outputs to determine a time series of values for one or more control signals for the wind turbine. In some embodiments, the model receives a wind speed measurement, and determines the time series of values based on the wind speed measurement (e.g., assuming that the wind speed will remain constant for the projected period). In one example, the objective function is a cost function that maximizes power production and/or revenue. In another example, the objection function is a cost function that minimizes fatigue loading of one or more wind turbine components. Other goals of the cost function (including combinations of goals) are also contemplated. The model applies the objective function in a first iteration, projecting the values for the one or more control signals for a period of time (e.g., a sequence of values for the next 20-30 seconds of operation). After resampling the measured parameters, wind turbine inputs, and/or wind turbine outputs, the model applies the objective function in a second iteration (and subsequent iterations), updating the projected values for the one or more control signals.

The predictive control module 535 generates one or more control signals to damp oscillations of the structure relative to the predicted steady-state deflection values $\overline{T_d}^*$. In some embodiments, the one or more control signals comprise one or both of: a pitch reference $\theta_{ref}$ for a pitch actuation system of the wind turbine, and a power reference $P_{ref}$ for a generator of the wind turbine. The pitch reference $\theta_{ref}$ may be applied collectively to multiple rotor blades, or may be applied to individual rotor blades. The power reference $P_{ref}$ may alternately be provided as a torque reference.

The one or more control signals are generated to damp the oscillations relative to the steady-state deflection, in contrast to damping relative to any deflection of the structure. Beneficially, by damping relative to the steady-state deflection, a relatively strong penalty may be imposed on movements when there is no predicted change in steady-state deflection, while permitting more rapid movements during transitions from one steady-state deflection to the predicted steady-state deflection to capture more of the available power.

Figure 7:
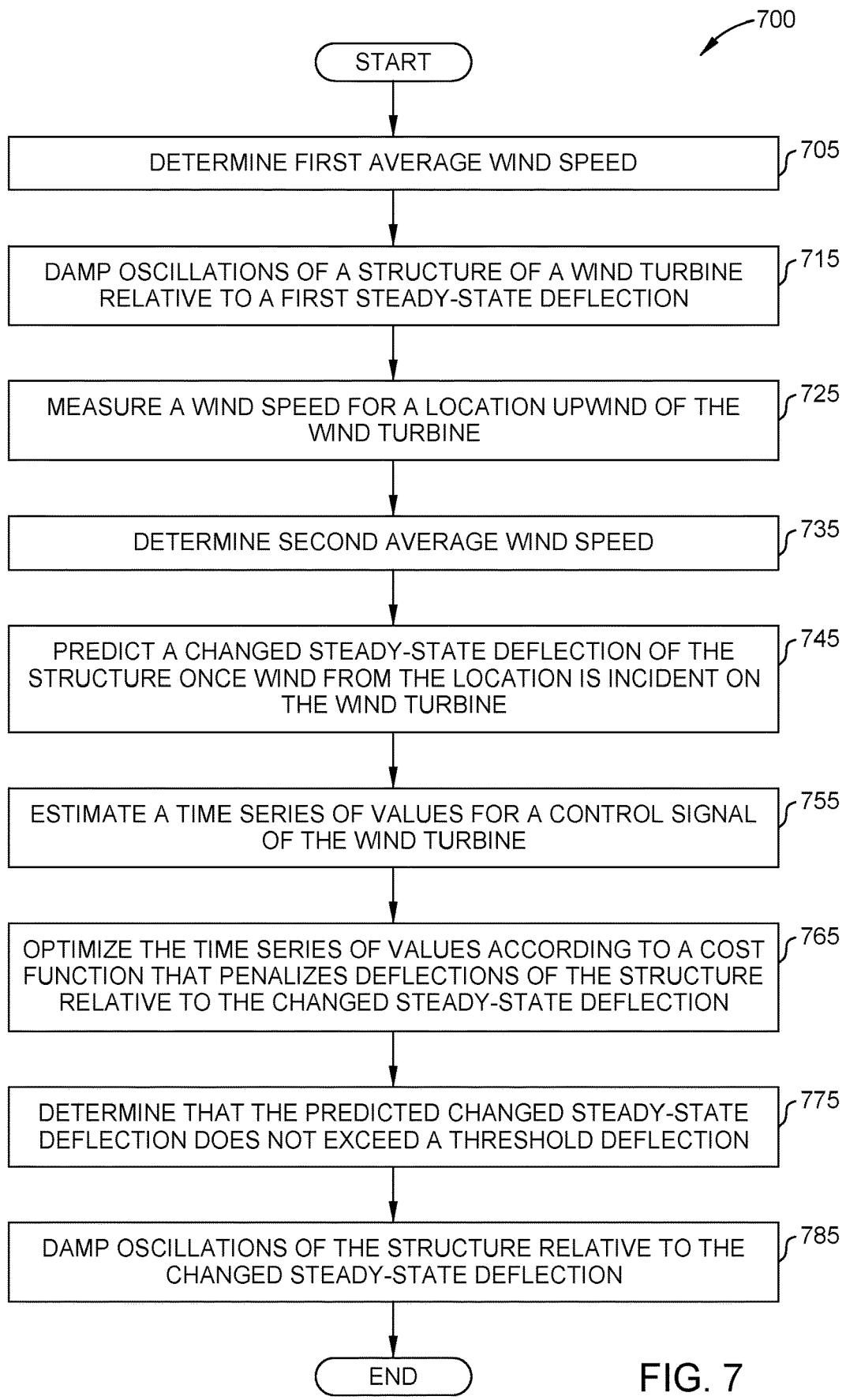
FIG. 7 is an exemplary method of operating a wind turbine, according to one or more embodiments.

FIG. 7 is an exemplary method 700 of operating a wind turbine, according to one or more embodiments. The method 700 may be used in conjunction with other embodiments, for example, being performed using the control system 500 of FIG. 5. The method 700 begins at block 705, where a first average wind speed is determined, e.g., by filtering wind speed measurements acquired by the control system 500. At block 715, oscillations of a structure of the wind turbine are damped relative to a first steady-state deflection. At block 725, a wind speed is measured for a location upwind of the wind turbine. At block 735, the control system 500 determines a second average wind speed.

At block 745, the control system 500 predicts a changed steady-state deflection of the structure. The predicted changed steady-state deflection corresponds to a time when wind from the location is incident on the wind turbine. At block 755, a predictive control module of the control system 500 estimates a time series of values for a control signal of the wind turbine. At block 765, the predictive control module optimizes the time series of values according to a cost function that penalizes deflections relative to the changed steady-state deflection. At block 775, the control system 500 determines that the predicted changed steady-state deflection does not exceed a threshold deflection. At block 785, the control system generates one or more control signals to damp oscillations of the wind turbine relative to the changed steady-state deflection. The method 700 ends following completion of block 785.

Figure 8:
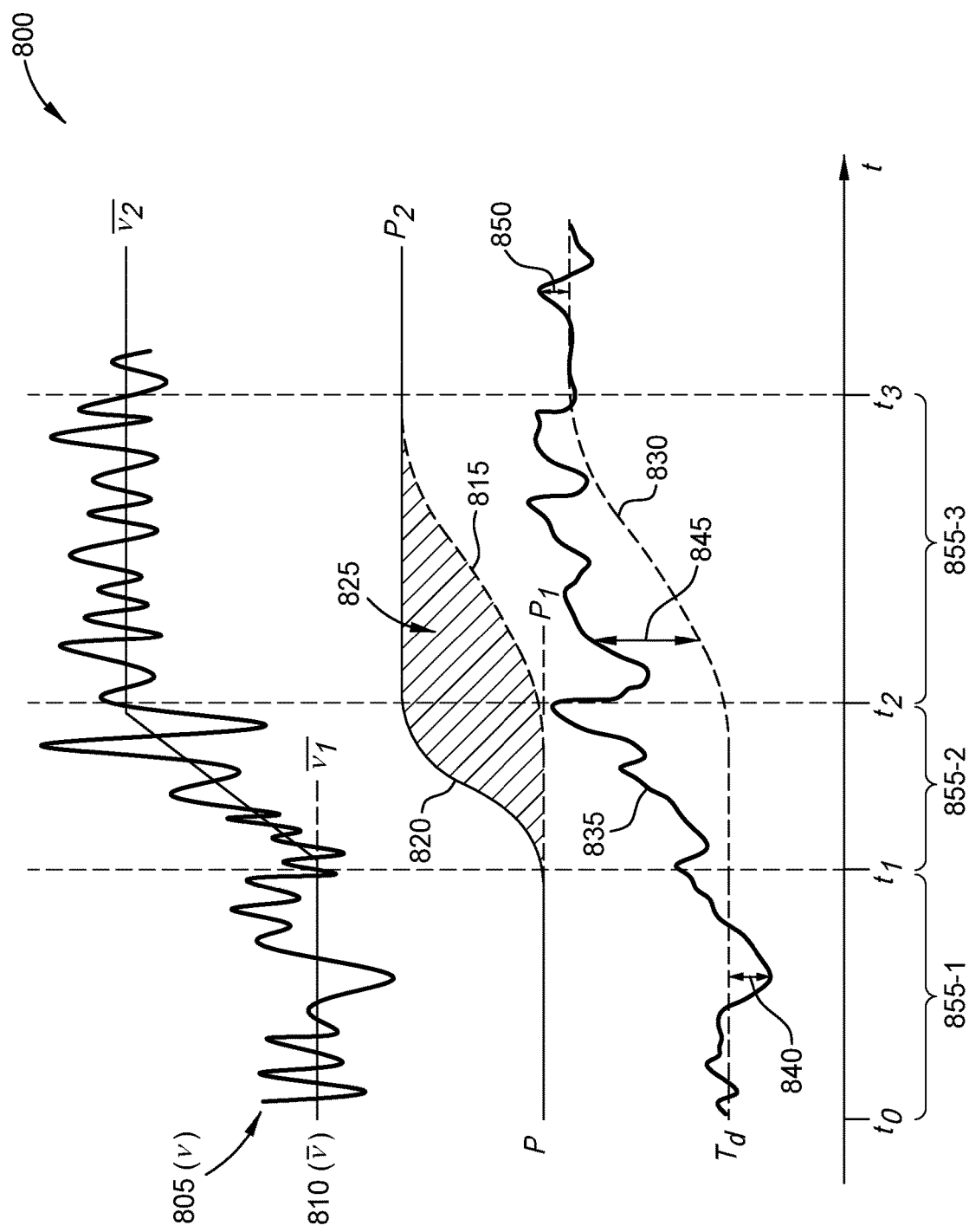
FIG. 8 is a graph illustrating exemplary operation of a wind turbine using predicted steady-state deflection of the tower, according to one or more embodiments.

FIG. 8 is a graph 800 illustrating exemplary operation of a wind turbine using predicted steady-state deflection of the tower, according to one or more embodiments.

The features depicted in the graph 800 may be used in conjunction with other embodiments, for example, reflecting operation of the control system 500 of FIG. 5.

Plot 805 represents the wind speed (v), and plot 810 represents the average wind speed ($\bar{v}$). During a first period 855-1 between time $t_0$ and time $t_1$, the average wind speed ($\bar{v}$) remains relatively steady at a first average wind speed ($\bar{v}_1$). Plot 820 represents a power production (P) of the wind turbine, and is a first power production level ($P_1$) during the period 855-1. Plot 835 represents a tower deflection ($T_d$) where damping is controlled relative to the steady-state tower deflection.

During a second period 855-2 between time $t_1$ and $t_2$, the average wind speed ($\bar{v}$) increases from the first average wind speed ($\bar{v}_1$) to a second average wind speed ($\bar{v}_2$). During a third period 855-3 between time $t_2$ and $t_3$, the average wind speed ($\bar{v}$) remains relatively steady at the second average wind speed ($\bar{v}_2$). The power production (P) is at the second power production level ($P_2$) during the period 855-2.

When the damping is controlled relative to any tower deflection, the increased tower deflection is penalized, whether resulting from an increase of the average wind speed ($\bar{v}$) or from turbulence. The tower deflection ($T_d$) remains relatively steady during the period 855-2 and slowly increases during the period 855-3 according to a plot 830. Accordingly, the power production (P) remains relatively steady during the period 855-2 and slowly increases during the period 855-3, according to a plot 815. As a result, some of the available power in the wind will be unnecessarily lost (lost power 825) during the increase of the average wind speed ($\bar{v}$).

Within the period 855-1, an arrow 840 extends between the plot 835 and the plot 830. Within the period 855-2, an arrow 845 extends between the plot 835 and the plot 830. Within the period 855-3, an arrow 850 extends between the plot 835 and the plot 830. The arrow 845 is longer than the arrows 840, 850, indicating a greater difference of tower deflection during the period 855-2. Thus, to effectively dampen tower deflections caused by turbulence (as in the period 855-1 and the period 855-3) the penalty weight is large enough that an even greater effect results for the much larger difference of a change in average wind speed ($\bar{v}$), as in the period 855-2.

According to embodiments described herein, the damping is controlled relative to the steady-state tower deflection, which allows a large penalty on tower deflections while still moving fast in the transition between operation points. When the damping is controlled relative to the steady-state tower deflection, the power production (P) tracks the increase of the average wind speed ($\bar{v}$) more closely, increasing from the first power production level ($P_1$) to a second power production level ($P_2$) during the period 855-2.

In the preceding, reference is made to embodiments presented in this disclosure. However, the scope of the present disclosure is not limited to specific described embodiments. Instead, any combination of the features and elements provided above, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the aspects, features, embodiments, and advantages described herein are merely illustrative and are not considered elements or limitations of the appended claims except where explicitly recited in a claim(s).

As will be appreciated by one skilled in the art, the embodiments disclosed herein may be embodied as a system, method, or computer program product. Accordingly, aspects may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects may take the form of a computer program product embodied in one or more computer readable medium(s) having computer readable program code embodied thereon.

The present invention may be a system, a method, and/or a computer program product. The computer program product may include a computer-readable storage medium (or media) (e.g., a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing) having computer readable program instructions thereon for causing a processor to carry out aspects of the present invention.

Aspects of the present disclosure are described with reference to flowchart illustrations and/or block diagrams of methods, apparatus (systems) and computer program products according to embodiments presented in this disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

The flowchart and block diagrams in the Figures illustrate the architecture, functionality and operation of possible implementations of systems, methods and computer program products according to various embodiments. In this regard, each block in the flowchart or block diagrams may represent a module, segment or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In view of the foregoing, the scope of the present disclosure is determined by the claims that follow.

The invention claimed is:

1. A method comprising:
measuring a wind speed for a location upwind of a wind turbine;
predicting, using the measured wind speed, a changed steady-state deflection of a structure of the wind turbine once wind from the location is incident on the wind turbine;
estimating, using the measured wind speed, a time series of values for a control signal of the wind turbine;
optimizing the time series of values according to a cost function that penalizes deflections of the structure relative to the predicted changed steady-state deflection; and
damping oscillations of the structure relative to the predicted changed steady-state deflection, wherein damping oscillations of the structure comprises generating the control signal with the optimized time series of values.

2. The method of claim 1, further comprising:
damping, based on a first average wind speed, oscillations of the structure relative to a first steady-state deflection; and
determining a second average wind speed from the measured wind speed,
wherein predicting the changed steady-state deflection is responsive to the second average wind speed differing from the first average wind speed.

3. The method of claim 2, wherein the structure is a tower of the wind turbine, and wherein predicting the changed steady-state deflection comprises:
determining a power production level of the wind turbine scheduled for the second average wind speed;
determining a thrust force on the tower at the power production level; and
determining the changed steady-state deflection of the tower based on the thrust force.

4. The method of claim 1, wherein estimating the time series of values and optimizing the time series of values are performed using model-based predictive control.

5. The method of claim 1, wherein the control signal comprises one of:
a pitch reference for a pitch actuation system of the wind turbine, and
a power reference for a generator of the wind turbine.

6. The method of claim 1, wherein measuring the wind speed for the location comprises:
receiving a sensor signal from a Light Detection and Ranging (LIDAR) system, the LIDAR system being disposed on the wind turbine or remote from the wind turbine.

7. The method of claim 1, wherein measuring the wind speed for the location comprises:
receiving a sensor signal from a sensor disposed on one of a met mast and a second wind turbine.

8. The method of claim 1, further comprising:
prior to damping the oscillations, determining that the predicted changed steady-state deflection does not exceed a threshold deflection.

9. A control system for a wind turbine, the control system comprising:
one or more computer processors configured to:
receive a measurement of a wind speed for a location upwind of the wind turbine;
predict, using the measured wind speed, a changed steady-state deflection of a structure of the wind turbine once wind from the location is incident on the wind turbine;
estimate, using the measured wind speed, a time series of values; and
optimize the time series of values according to a cost function that penalizes deflections of the structure relative to the predicted changed steady-state deflection; and
generate one or more control signals to damp oscillations of the structure relative to the predicted changed steady-state deflection, wherein the one or more control signals are generated with the optimized time series of values.

10. The control system of claim 9, wherein the one or more computer processors are further configured to:
filter the measurement of the wind speed to determine an average wind speed;
wherein predicting the changed steady-state deflection is responsive to the average wind speed differing from a second average wind speed determined based on another instance of receiving a measurement of the wind speed.

11. The control system of claim 10, wherein the structure is a tower of the wind turbine, and wherein predicting the changed steady-state deflection comprises:
determining a power production level of the wind turbine scheduled for the second average wind speed;
determining a thrust force on the tower at the power production level; and
determining the changed steady-state deflection of the tower based on the thrust force.

12. The control system of claim 10, wherein estimating the time series of values and optimizing the time series of values are performed using model-based predictive control.

13. A wind turbine comprising:
a structure; and
a controller configured to:
receive a measurement of a wind speed for a location upwind of the wind turbine;
predict, using the measured wind speed, a changed steady-state deflection of the structure once wind from the location is incident on the wind turbine;
estimate, using the measured wind speed, a time series of values;
optimize the time series of values according to a cost function that penalizes deflections of the structure relative to the predicted changed steady-state deflection; and
generate one or more control signals to damp oscillations of the structure relative to the predicted changed steady-state deflection, wherein the one or more control signals are generated with the optimized time series of values.

14. The wind turbine of claim 13, further comprising:
a generator coupled with one or more rotor blades; and
a pitch actuation system configured to adjust a pitch angle of the one or more rotor blades,
wherein the one or more control signals comprise one or both of:
a pitch reference for the pitch actuation system, and
a power reference for the generator.

15. A computer program product comprising a computer readable medium storing code executable by one or more computer processors to control an operation of a wind turbine, the operation comprising:

measuring a wind speed for a location upwind of the wind turbine;

predicting, using the measured wind speed, a changed steady-state deflection of a tower of the wind turbine once wind from the location is incident on the wind turbine;

estimating, using the measured wind speed, a time series of values for a control signal of one or more control signals;

optimizing the time series of values according to a cost function that penalizes deflections of the tower relative to the predicted changed steady-state deflection; and issuing the one or more control signals to actively dampen oscillations of the tower relative to the predicted changed steady-state deflection, wherein damping oscillations of the tower comprises generating the control signal with the optimized time series of values.

16. The computer program product of claim 15, further comprising:

damping, based on a first average wind speed, oscillations of the tower relative to a first steady-state deflection; and determining a second average wind speed from the measured wind speed, wherein predicting the changed steady-state deflection is responsive to the second average wind speed differing from the first average wind speed.

17. The computer program product of claim 16, wherein predicting the changed steady-state deflection comprises:

determining a power production level of the wind turbine scheduled for the second average wind speed;

determining a thrust force on the tower at the power production level; and determining the changed steady-state deflection of the tower based on the thrust force.

\* \* \* \* \*